(12) United States Patent
Vigneras

(10) Patent No.: US 9,136,062 B2
(45) Date of Patent: Sep. 15, 2015

(54) METHOD FOR SEALING AN IMPREGNATION OPENING OF AN ENERGY STORAGE ASSEMBLY

(75) Inventor: Erwan Vigneras, Quimper (FR)

(73) Assignee: BLUE SOLUTIONS, Ergue Gaberic (FR)

( * ) Notice: Subject to any disclaimer, the term of this patent is extended or adjusted under 35 U.S.C. 154(b) by 86 days.

(21) Appl. No.: 13/985,040

(22) PCT Filed: Feb. 10, 2012

(86) PCT No.: PCT/EP2012/052263
§ 371 (c)(1),
(2), (4) Date: Aug. 12, 2013

(87) PCT Pub. No.: WO2012/110408
PCT Pub. Date: Aug. 23, 2012

(65) Prior Publication Data
US 2013/0318779 A1 Dec. 5, 2013

(30) Foreign Application Priority Data

Feb. 18, 2011 (FR) ...................................... 11 51352

(51) Int. Cl.
*H01M 2/36* (2006.01)
*H01G 9/00* (2006.01)
*H01G 9/10* (2006.01)
*H01G 11/80* (2013.01)
*H01G 2/10* (2006.01)

(52) U.S. Cl.
CPC ............. *H01G 9/0029* (2013.01); *H01G 2/103* (2013.01); *H01G 9/10* (2013.01); *H01G 11/80* (2013.01); *H01M 2/361* (2013.01); *H01M 2/365* (2013.01); *Y02E 60/13* (2013.01); *Y10T 29/417* (2015.01); *Y10T 29/4911* (2015.01)

(58) Field of Classification Search
CPC ....... H01M 2/36; B23K 20/122; H01G 9/145; H01G 9/00; H01G 2/10
USPC ............................................................ 29/623
See application file for complete search history.

(56) References Cited

U.S. PATENT DOCUMENTS

| | | |
|---|---|---|
| 5,150,745 A | 9/1992 | Ford et al. |
| 2005/0178817 A1* | 8/2005 | Takase et al. ............... 228/112.1 |

FOREIGN PATENT DOCUMENTS

| | | |
|---|---|---|
| EP | 0 817 289 A2 | 1/1998 |
| GB | 1 329 783 | 9/1973 |
| JP | 2003-197179 A | 7/2003 |

OTHER PUBLICATIONS

JP 2003197179 A, Jul. 11, 2013, 1-18. (English Human Translation).*

*Primary Examiner* — Patrick Ryan
*Assistant Examiner* — Zhongqing Wei
(74) *Attorney, Agent, or Firm* — Blakely Sokoloff Taylor & Zafman LLP

(57) ABSTRACT

A method for sealing an impregnation orifice of an energy storage assembly including a case. The orifice is provided in one of the walls of the case and has an outer mouth and an inner mouth. At least one end portion of a head of a tool driven in rotation is inserted into the orifice through the outer mouth, in a direction corresponding to the axis of the orifice in order to heat an area of the case in the vicinity of the orifice. The head has at least a first transverse section, and a second transverse section that is smaller than the first transverse section. Once the area is heated, a translation of the tool in the direction of the inner mouth moves the material forming the walls of the orifice in the direction of the inner mouth, and the orifice is sealed by readhesion of the material.

15 Claims, 2 Drawing Sheets

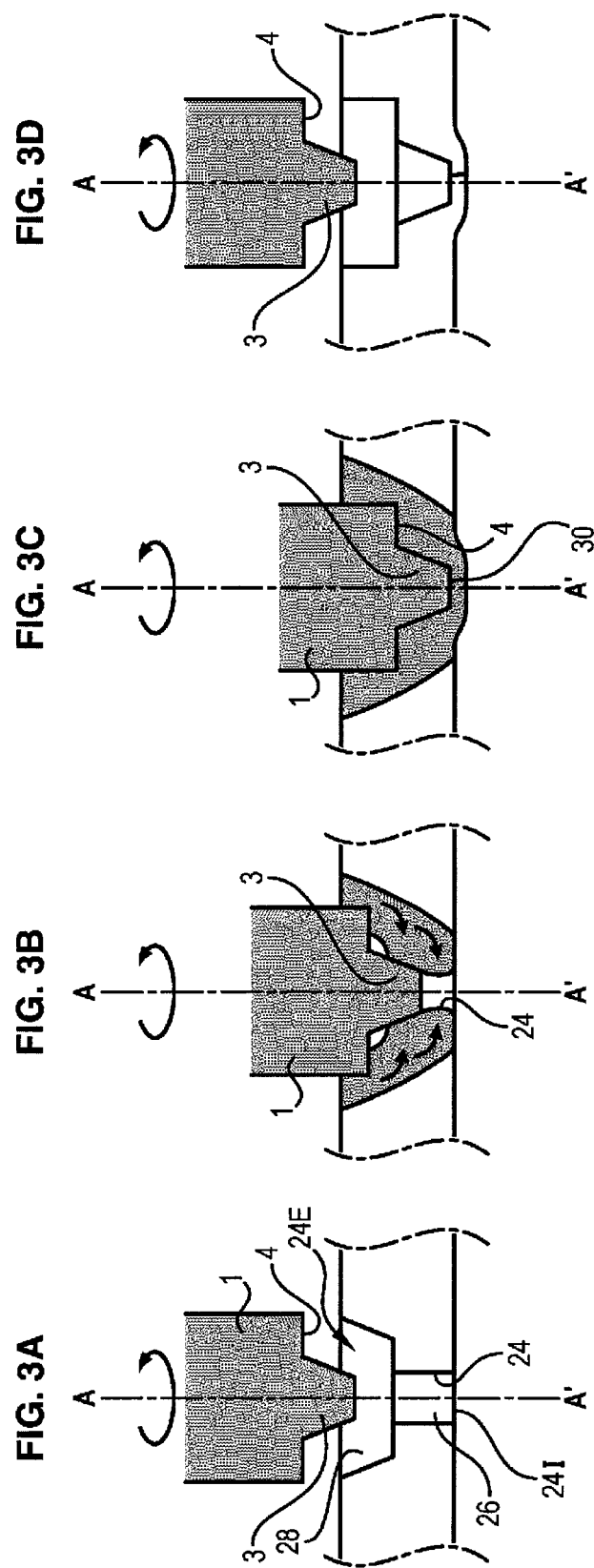

METHOD FOR SEALING AN IMPREGNATION OPENING OF AN ENERGY STORAGE ASSEMBLY

TECHNICAL FIELD

The present invention concerns the technical field of electrical energy storage assemblies.

More specifically, the present invention concerns a method for fabricating such storage assemblies.

In the present invention by "electrical energy storage assembly" is meant either a capacitor (i.e. a passive system comprising electrodes and an insulator) or a supercapacitor (i.e. a passive system comprising at least two electrodes, an electrolyte and at least one separator) or a battery (i.e. a system comprising an anode, a cathode and an electrolyte solution between the anode and cathode) e.g. of lithium battery type.

STATE OF THE ART

Supercapacitors are known in the prior art comprising a case provided with a housing to receive two electrodes separated by an electrically insulating separator. The case is formed of a tube having a bottom which is then capped with a cap. The case i.e. the tube and/or cap, comprises one (or more) impregnation orifices to fill the housing with an electrolyte.

Once the electrolyte has been placed in the housing, the impregnation orifice is sealed to obtain tightness to dust, water, etc.

In the state of the art, the impregnation orifice is generally sealed using a rivet under which a sealing gasket is positioned or a part in elastomer material press-fitted onto the case in the impregnation orifice.

The prior art methods therefore require the use of one or more parts dedicated solely to sealing the impregnation orifice.

In addition, one disadvantage related to the use of a seal or elastomer part to seal the case is that these may become porous over time thereby degrading the lifetime of the supercapacitor. Also, the size and centring of the impregnation orifices intended to receive the rivets or elastomer parts must be controlled which makes the sealing of these orifices fairly difficult to implement on an industrial scale.

Said method for sealing the impregnation orifice is thus relatively costly.

It is therefore the objective of the invention to develop a method for sealing the impregnation orifice that is simple and low-cost.

SUMMARY OF THE INVENTION

For this purpose, the subject of the invention is a method for sealing an impregnation orifice of an energy storage assembly, the assembly comprising a case containing at least two electrodes, the orifice being arranged in one of the walls of the case and having an outer mouth located on the outer side of the case and an inner mouth located on the inner side of the case, the method comprising:
  a step to insert into the orifice via the outer mouth at least one end part of a head of a tool driven in rotation in a direction essentially corresponding to an axial direction of the orifice, to heat a zone of the case in the vicinity of the orifice, the head comprising at least one first cross-section at its base and a second cross-section at its end of smaller dimensions than the first cross-section;
  once the zone of the case has been heated, a step to translate the tool in the direction of the inner mouth to cause displacement of material in the direction of the inner mouth and to seal the orifice by re-adhesion of the material.

The displaced material is the material of the case forming the walls of the orifice before implementing the method. The closing of the sealing orifice can therefore be achieved without the providing of additional material.

The sealing of the orifice is obtained by heating the material in the region of the orifice to a paste then pushing this paste towards the inner mouth of the orifice to obtain re-adhesion thereof at this point. The material of the case treated in this manner alone allows the sealing the orifice.

It is therefore not necessary to make use of additional parts to seal the impregnation orifice. In addition, the device used to obtain sealing of the impregnation orifice is of very simple design and requires little maintenance. It is therefore most economical. Also, the sealing of the impregnation orifice can be performed using the method of the invention within a very short time (in the order of a few seconds) using limited energy and hence with improved yield.

It is not necessary either to prepare the surface of the orifice beforehand as is the case for a conventional soldering or gluing method. Also, the method does not require the use of consumables since sealing is achieved using the constituent material of the case. It is furthermore scarcely pollutant, in particular not releasing any smoke.

With the method of the invention, it is thus possible to seal the impregnation orifice using a simple, low-cost method.

It is to be noted that it is possible to implement the method of the invention without the risk of deteriorating the supercapacitor. Heating of the case is reduced since re-adhesion is obtained when the material is in paste form. This allows sealing of the impregnation orifice without damaging the electrodes lying close thereto.

Additionally, since the heat affected zone of the case is very small, the method does not cause degradation of the mechanical strength of the case. The electrical conductivity of the supercapacitor is not perturbed either by said method since no addition of material is required other than the constituent material of the case.

Preferred but non-limiting aspects of the method of the invention are the following:
  once the tool has been translated to a predetermined position, the method comprises a step at which the tool continues to be driven in rotation. At this step, the heated material is worked to ensure better re-adhesion thereof at the inner mouth of the orifice;
  the tool head has a tip. In other words, the cross-section of at least part of the tool head varies continuously;
  the tip is sized so that at least one cross-section of the orifice is smaller than the cross-section of the tip at its base but larger than the cross-section of the tip at its end, notably corresponding to the tip of the tool. This allows heating of the material around the entire periphery of the orifice without it being necessary to generate movement of the tool perpendicular to the direction of its axis of rotation;
  the tip has a shape of revolution for more homogeneous heating of the material. The tool as a whole may also have a shape of revolution;
  the tip is of truncated cone shape;
  the tool head may also comprise a peripheral shoulder extending over a plane essentially perpendicular to the axis of rotation;

the impregnation orifice having a variable cross-section, the cross-section of the head at the shoulder is chosen to be between the smallest and largest cross-sections of the orifice. This also obviates the need for additional tool movements;

the tool may have a pin at the tip of the head;

the tool is made in metal such as steel e.g. high speed steel (HSS), said material being heat resistant and sufficiently hard to limit wear of the tool;

when implementing the method, the tool is driven in rotation at a speed of between 600 and 2,000 rpm, preferably between 800 and 1,200 rpm, this speed being adapted to the type of material to be heated, namely aluminium for most case materials;

the predetermined position and/or duration of the different steps are determined by means to control force and/or position and/or temperature integrated in the tool for example, which allows guaranteed constant quality of the sealing despite variations related to industrialization of the method, e.g. different case dimensions;

the method comprises a step at which, the tool head being removable relative to a body of the tool, the body of the tool is withdrawn from the case whilst the head remains in place on the case. The head will then remain permanently in place on the energy storage assembly. Its shape exactly matches the shape of the case since the material of the case has been shaped with this head. It is therefore held in place on the case via mating shape. The maintaining of this head on the case provides additional safety regarding the sealing of the impregnation orifice and allows a reduction in reject rate which could be generated by this method, even if this embodiment is more costly. In this embodiment, the presence of the stopper does not prevent re-adhesion of the case material initially forming the walls of the orifice;

the method comprises a step at which the tool is withdrawn from the case—for example prior to cooling and setting of the material—so that the tool head is not in contact with the case. During this withdrawal step the tool and in particular the head can still be driven in rotation. This prevents the head adhering to the assembly (due to cooling of the material forming the case). This is not compulsory however since if withdrawal is sufficiently rapid the tool can at all events be easily withdrawn from the assembly without adhering thereto. The tool is therefore fully re-usable allowing further savings in manufacturing costs;

the case comprises at least one tube, optionally provided with a bottom, and at least one cap, the impregnation orifice being arranged in the tube or the cap.

A further subject of the invention is a method for sealing the impregnation orifices of a plurality of energy storage assemblies, each assembly comprising a case containing at least two electrodes, and a sealing orifice arranged in one of the walls of the case and having an outer mouth located on the outer side of the case and an inner mouth located on the inner side of the case, the method comprising:

an insertion step to insert, in the orifice of a first assembly via the outer mouth, at least one end part of the head of a tool driven in rotation in a direction essentially corresponding to an axial direction of the orifice, so as to heat a zone of the case in the vicinity of the orifice, the head comprising at least a first cross-section at its base and a second cross-section at its end of smaller dimensions than the first cross-section;

once the zone of the case is heated, a step to translate the tool in the direction of the inner mouth to cause displacement of the material of the case, initially forming the walls of the orifice, in the direction of the inner mouth and to seal the orifice by causing re-adhesion of said case material;

the insertion and translation steps of the tool being repeated at least once to seal the impregnation orifice of at least one other energy storage assembly.

BRIEF DESCRIPTION OF THE FIGURES

Other characteristics, objectives and advantages of the present invention will become apparent from the following description which is solely illustrative and non-limiting and is to be read in connection with the appended drawings in which:

FIGS. 3A to 3D illustrate a detail of the supercapacitor in FIG. 1 taken along line A-A' of FIG. 2 at different steps of a method for sealing an impregnation orifice of a supercapacitor according to one embodiment of the invention.

DETAILED DESCRIPTION OF THE INVENTION

A more detailed description will now be given of a method for sealing an impregnation orifice according to one embodiment of the invention.

Figure 1:
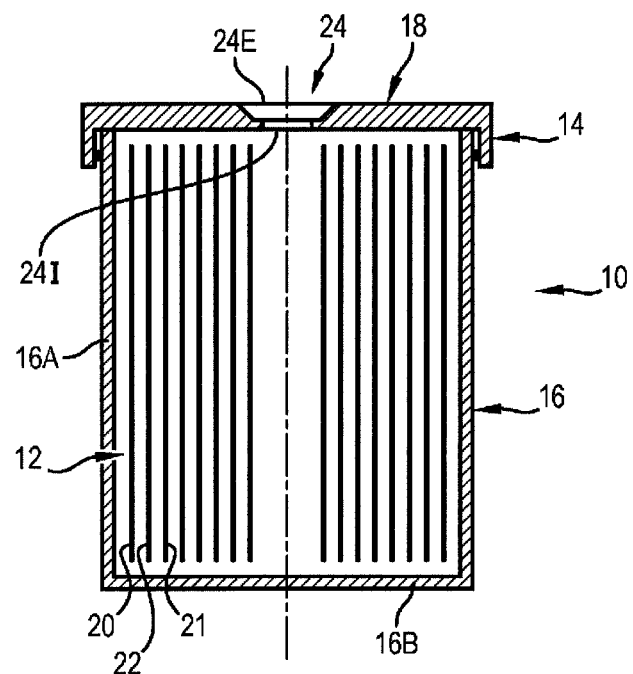
FIG. 1 is a schematic cross-sectional view of a supercapacitor for which the method of the invention is implemented.
Figure 2:
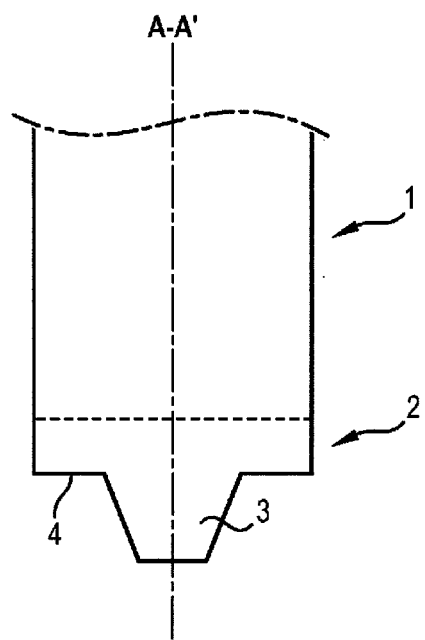
FIG. 2 is a schematic cross-sectional illustration of a tool used to implement one embodiment of the invention.

With reference to FIG. 1, an example of embodiment is illustrated of a supercapacitor for which the method of the invention is followed.

The supercapacitor 10 comprises a spiral-winding 12 positioned in a case 14 formed in the described embodiment of a tube 16 comprising a cylindrical side wall 16A and a bottom 16B and a cap 18 capping the tube 16 for closing thereof. The tube 16 and the cap 18 are welded over their entire periphery to ensure imperviousness of the supercapacitor. The tube 16 and the cap are generally made in aluminium.

The spiral-winding 12 is formed of a unit comprising two electrode foils 20, 21 and an insulating separator 22 that are superimposed, the separator being inserted between the two electrode foils 20, 21.

Each electrode foil comprises a collector and an electrode formed of an active material notably containing activated carbon and deposited on the two opposite sides of the collector.

The cap 18 comprises a through impregnation orifice 24 arranged in its centre. Said orifice is used to inject an electrolyte, essential for functioning of the supercapacitor, into the case. This impregnation orifice is intended to be sealed. It has an outer mouth 24E opening onto the outer side of the case and an inner mouth 24I opening onto the inner side of the case.

As can better be seen in FIG. 3, the orifice is funnel-shaped flaring at its outer mouth 24E. It comprises a first part 26 of constant cross-section which comprises the inner mouth 24I, and a second part 28 of flared cross-section leading to the first part 26 at its small cross-section and comprising the outer mouth 24E at its other end at its large cross-section.

To guarantee imperviousness of the supercapacitor, once the electrolyte has been injected, the impregnation orifice must be sealed. It is this method that will be detailed in the remainder of the description.

First a description is given of a tool used to implement the method according to one embodiment of the invention.

The tool comprises a body of cylindrical shape 1 extending along an axis of revolution A-A'. The constituent material of the body 1 is steel for example, or any type of material having greater hardness than the case material namely aluminium in the example described here.

The tool also comprises a head 2 extending to one of the axial ends of the body 1. The head has a tip 3 of truncated cone shape and a peripheral shoulder 4 that extends over a plane substantially perpendicular to the axis of revolution A-A' of the body 1.

The body 1 and the head of the tool are adapted to be driven in rotation around an axis of rotation corresponding to the axis of revolution A-A' of the body 1. The tool also has at least one degree of freedom enabling it to translate in the direction of its axis of rotation.

The tool comprises a motor (not illustrated) to drive the body and head of the device in rotation. The motor is capable for example of rotating the body and head of the device at a speed of between 600 and 2,000 rpm and preferably of 1,000 rpm.

Advantageously, it may comprise position referencing means to control the entry of the body and head into the case. It may also comprise force measuring means to control the force applied by the rotating tool on the case material and/or temperature measuring means to determine the temperature reached by the case material.

A more detailed description will now be given of the method for sealing the impregnation orifice 24 with reference to FIGS. 3A to 3D.

At a first step of the method illustrated in FIG. 3A, the body 1 and the head 2 of the tool are driven in rotation by the motor relative to the axis A-A'. The head is positioned above the impregnation orifice 24.

The body 1 of the device is then translated along its axis of rotation A-A' to insert the head and in particular the tip 3 into the impregnation orifice 24 via the outer mouth 24E. As can be seen in FIG. 3B, the tip is sized so that the cross-section of the end of the tip is smaller than the cross-section of the first part of the orifice, whereas the cross-section of the base of the tip is larger than the cross-section of the first part. Similarly, the tool is sized so that the shoulder 4 comes into contact with the second flared part of the orifice 24.

The tip 3 and the shoulder 4 of the tool are then in contact with the entire periphery of the orifice.

Once this configuration has been reached, friction between a zone of the cap 18 located in the vicinity of the orifice 24 and the head (at the truncated cone-shaped tip and the shoulder) heats the material of the part to a temperature of about 450° C. The material then changes from a solid state to a paste.

When the material reaches this state, the tool is translated towards the inner mouth 24I of the impregnation orifice, as far as a predetermined position illustrated in FIG. 3C.

The predetermined position is determined in particular via position-referencing means of the tool.

At this step, the material is pushed to the back of the impregnation orifice 24 towards the inner mouth 24I as shown by the arrows in FIG. 3B under the action of translation of the surfaces of the shoulder and tip also causing displacement of the paste material in this direction. The material which previously formed the walls of the impregnation orifice is therefore caused to re-adhere to the lower part of the orifice at the re-adhesion line 30 located in the vicinity of the inner mouth 24I. The pointed shape of the tool promotes closing of the orifice.

Once in the configuration illustrated in FIG. 3C, the method comprises a step at which the driving in rotation of the tool is continued whilst the tool is held in the predetermined position. This allows the material of the cap to be worked to ensure better cohesion of the material at the point of re-adhesion.

The tool is then withdrawn from the case and is no longer in contact with the material of the case. The material therefore cools and sets in the configuration illustrated in FIG. 3D. The impregnation orifice is thus sealed. The tool withdrawal step can be performed by continuing rotation of the tool.

After withdrawal of the tool, it can be used to seal an impregnation orifice of other assemblies, this tool not having undergone any modification when sealing the orifice of the assembly.

The person skilled in the art will appreciate that numerous modifications can be made to the above-described method without departing in substance from the novel teachings given herein. Therefore the examples just given are evidently only particular illustrations that are in no way limiting. For example, the invention may comprise the following variants.

The shape of the impregnation orifice is not limited to the shape described above; the impregnation orifice may be configured for example with a constant cross-section. The case may also comprise a bottomless tube provided with two caps at each of its ends. The assembly may also comprise more than one impregnation orifice and/or an impregnation orifice arranged on the tube.

It is also possible to envisage a parallelepiped shape of the case and the electrode foils and separator are not wound but merely stacked.

The tool may also have a different shape from the one described. For example, it may comprise a shoulder and an element of smaller dimensions at its end, the element being of cylindrical or rectangular shape. It could also not have any shoulder but only a tapered element at its end.

It could also be envisaged that the tool is not necessarily sized so that the cross-section of the base of its head is larger than at least one cross-section of the orifice. In this case, the method comprises an additional translation step, for example rotating translation of the tool in a plane of the normal essentially parallel to the axis of rotation of the tool.

The speed of the tool may also differ from that described or it may be variable. The materials of the case and/or of the tool may also differ from the description given.

It could also be envisaged that the head of the tool is removable and that it is detached from the body of the tool before withdrawing the tool from the case. The shape of the head then exactly mates with the shape of the case. It therefore remains in place thereupon and acts as stopper.

It is also to be noted that the rotation step of the tool after translation thereof is optional.

The invention claimed is:

1. A method for sealing an impregnation orifice of an energy storage assembly, the assembly comprising a case containing at least two electrodes, the orifice being arranged in one of the walls of the case and having an outer mouth located on the outer side of the case, and an inner mouth located on the inner side of the case, the method comprising:

inserting in the orifice via the outer mouth at least one end part of a head of a tool driven in rotation, in a direction essentially corresponding to an axial direction of the orifice so as to heat a zone of the case in the vicinity of the orifice, the head of the tool comprising at least one first transverse section at its base and a second transverse section at its end, said second transverse section being of smaller dimensions than the first transverse section;

once the zone is heated, translating the tool in the direction of the inner mouth to cause displacement of the material of the case initially forming the walls of the orifice, in the direction of the inner mouth and sealing the orifice by re-adhesion of said case material, without additional material.

2. The method according to claim 1 comprising continuing to drive the tool in rotation once the tool has been translated as far as a predetermined position.

3. The method according to claim 2 wherein at least one of the predetermined position and duration of the steps are determined by at least one of a force and a position controller.

4. The method according to claim 3, wherein at least one of the force and position controller is integrated in the tool.

5. The method according to claim 1 wherein the head of the tool comprises a tip.

6. The method according to claim 5 wherein the tip is sized so that at least one transverse section of the orifice is smaller than a transverse section of the tip but larger than the transverse section of the tip at its end.

7. The method according to claim 5 wherein the head of the tool comprises a tip of truncated cone shape.

8. The method according to claim 1 wherein the head has a peripheral shoulder extending over a plane essentially perpendicular to the axis of rotation of the tool.

9. The method according to claim 8 wherein the impregnation orifice having a transverse section of variable size, the transverse section of the head at the shoulder is chosen to be between the smallest and largest transverse sections of the orifice.

10. The method according to claim 1 during which the head is driven in rotation at a speed of between 600 and 2,000 rpm.

11. The method according to claim 10, during which the head is driven in rotation at a speed of between 800 and 1200 rpm.

12. The method according to claim 1 comprising a step at which the tool is withdrawn from the case prior to cooling and setting of the material.

13. The method according to claim 1 comprising a step during which the tool is withdrawn from the case so that the head of the tool is no longer in contact with the case.

14. The method according to claim 13 wherein the tool withdrawal step is performed while rotation of the tool is continued.

15. The method according to claim 1 wherein the case comprises a tube optionally provided with a bottom and at least one cap, the impregnation orifice being positioned on the cap or on the tube in particular on its bottom wall.

\* \* \* \* \*